(12) United States Patent
Link

(10) Patent No.: US 6,229,127 B1
(45) Date of Patent: May 8, 2001

(54) PORTABLE INDUCTION HEATER

(75) Inventor: Roger V. Link, Knutsford (GB)

(73) Assignee: Valro Manufacturing Limited (GB)

( * ) Notice: Subject to any disclaimer, the term of this patent is extended or adjusted under 35 U.S.C. 154(b) by 0 days.

(21) Appl. No.: 09/236,836

(22) Filed: Jan. 25, 1999

(30) Foreign Application Priority Data

May 20, 1998 (GB) .................................. 9810786

(51) Int. Cl.$^7$ .............................. H05B 6/10; H05B 6/06
(52) U.S. Cl. .................. 219/635; 219/633; 219/665; 219/650; 219/672; 219/518
(58) Field of Search ................... 219/635, 634, 219/633, 647, 650, 663, 665, 672, 676, 677, 518

(56) References Cited

U.S. PATENT DOCUMENTS

| | | | |
|---|---|---|---|
| 4,120,712 | 10/1978 | Sindt | 219/633 |
| 4,268,737 | * 5/1981 | Paschakarnis et al. | 219/635 |
| 4,319,109 | * 3/1982 | Bowles | 219/665 |
| 4,418,260 | * 11/1983 | Detrick | 219/635 |
| 5,101,086 | * 3/1992 | Dion et al. | 219/677 |

FOREIGN PATENT DOCUMENTS

| | | |
|---|---|---|
| 0 735 210 A1 | 10/1996 | (EP) . |
| 05315064 | 11/1993 | (JP) . |
| 06111924 | 4/1994 | (JP) . |
| 10083884 | 3/1998 | (JP) . |

* cited by examiner

*Primary Examiner*—Philip H. Leung
(74) *Attorney, Agent, or Firm*—Barlow, Josephs & Holmes, Ltd.

(57) ABSTRACT

An induction heater having an induction coil (26) for heating a metallic substance (4) hidden by a membrane (2), the metallic substance being coated with a heat activated adhesive on its side adjacent the membrane (2). The heater having four location sensor coils (36) for detecting the position of the hidden metallic substance and means to facilitate the placement of the induction coil (26) over the hidden metallic substance (4), based on information from the sensors. Once the induction coil (26) is over the metallic substance (4) it is used to heat the adhesive thereby adhering the metallic substance (4) to the membrane (2). The sensors (36) are adjacent the inductor coil (26) and are insulated therefrom by an air gap (38).

15 Claims, 6 Drawing Sheets

PORTABLE INDUCTION HEATER

BACKGROUND OF THE INVENTION

1. Field of the Invention

The present invention relates to portable induction heaters.

2. Description of the Related Art

Plastic and rubber membranes are utilised for providing waterproofing to roofing structures, tunnels and tanks. In the roofing industry, the membranes are laid down upon an insulation layer of either rockwool board, plastic resin foam board or even gypsum board, which is itself laid and fixed to the main substructure, which could be concrete, wood or steel sheet. The membranes are fixed either by glue, directly to the insulation boards, as in FIG. 10, or glued to numerous small anchor pads that have been screwed to the substructure through the insulation boards, as in FIG. 11. The glue is usually a solvent based adhesive, which is toxic and unpleasant to apply and can have unacceptably long curing times in cold climate conditions. Alternatively, the membranes are fixed with screws and suitable washers directly through the edge of each sheet of membrane and into the substructure through the insulation boards. This has the disadvantage that additional steps must be taken to prevent leakage through the membrane at the points where the fastenings extends therethrough in that the next sheet of membrane laid must cover the screws and fixings and then be heat welded to the previous sheet, as in FIG. 12.

In order to overcome the aforementioned problems a rigid plastic anchor disc, as in FIG. 13, is fixed to the substructure through a pad of membrane and on through the insulation boards. The membrane pad is substantially larger than the anchor disc and has received a factory coating of heat activated adhesive mixed with a powdered metallic substance on the upper surface of the pad that is clear of the anchor disc. It is also possible that the metallic powder may be incorporated within the substance of the membrane pad at the time of manufacture. The main covering membrane overlays the anchor and membrane pad.

The powdered metallic substance is heated by an induction heater which glues the membrane pad to the overlaying membrane, thereby entrapping the plastic anchor disc and anchoring the membrane. Alternatively a metallic anchor disc can be used as in FIG. 14.

UK Patent Application No. 9506694.09 (Robertson) describes the use of an induction heater to perform the bonding operation, however it is impossible to locate the induction coil of the induction heater reliably and accurately over the metallic anchor disc or powder that requires heating (within 1 mm), because it cannot be seen underneath the membrane. Failure to guarantee accurate location causes one part of the anchor disc overheat and burn the adhesive whilst the other half is under heated and not properly bonded. Inaccurate placement could cause over-heating damage to both the adhesive and the membrane, whilst under-heating would not provide sufficient bond strength. Either of these conditions could cause the failure of the roof over an extended time scale but particularly during high wind conditions.

SUMMARY OF THE INVENTION

It is an object of the present invention to overcome or alleviate the above described drawbacks and to provide for more accurate placement of the induction heater over the metallic substance to be heated.

In accordance with the present invention there is provided an induction heater for heating a hidden metallic substance, the heater having an induction coil for remotely heating a metallic substance, a sensor for detecting the position of said hidden metallic substance and means to facilitate placement of the induction coil directly over the hidden metallic substance based on information provided from said sensor.

The accurate placement of the induction coil over the hidden metallic substance to be heated reduces the incident of operator error and in the case of anchoring roofing membranes to the main roof structure by the use of fixed underlying metallic discs coated with heat activated adhesive, the accuracy of placement of the induction head bears a direct relationship to the strength of the anchor's bond to the membrane, reducing the incidence of the membrane coming away from the roof in high wind conditions and reducing the amount of time needed to secure the membrane to the roof.

Preferably, the means to facilitate the placement of the induction heater comprises a visual display which indicates the direction the heater must be moved to bring the induction coil over the hidden metallic substance. Preferably, the means to facilitate comprises means to provide an audible signal to indicate the progress of the heat cycle.

Preferably the sensor is adjacent the induction coil and insulating means are provided to reduce the flow of heat from the induction coil to the sensor. This reduces damage to the sensor during operation of the induction coil. The insulating means can be an air gap between the sensor and induction coil and/or coiling means provided to cool the induction coil. In a preferred embodiment the induction coil is in the form of a tube which provides a path for flow of a coolant. Preferably said path extends beyond the induction coil and passes through a heat exchanger.

Preferably the induction heater is portable and has a manually directable induction head containing the sensor and the induction coil, which head is connected to a main control box by a flexible cable.

A micro processor controls all the function of the induction heater as well as the continuous monitoring of operating and fault conditions.

A very stable crystal controlled sine wave generator is used to provide the electromagnetic field for the location sensors. This sensor frequency drive is connected to the main induction coil, (or a separate coaxial auxiliary coil if the physical constraints of the size of the metallic substance do not allow use of the induction coil), at all times, except when the heat cycle is in operation. A relay operated by the micro computer disconnects the sensor frequency drive before heating and reconnects it again after heating.

Preferably, the sensor is s four quadrant metal detection device having in a preferred embodiment four, separate, ferrite cored sensing coils placed at opposite ends of two radial orthogonal centre lines about the vertical axis of the induction coil with their sensing poles on the same plane as the lower face of the induction coil. The sensor coils on radially opposite sides of the induction coil are treated as a pair. There are two configurations of the assembly which are as follows: Where it is required to heat a flat metallic object evenly, over its surface, to it's centre, then the sensing coils would be distributed evenly about the external radius of the induction coil, however, if it is required only to heat an external ring of metallic substance then the sensing coils may either be distributed within the internal radius of the induction coil, providing there is sufficient space, or externally as before.

Preferably a high performance induction grade of ferrite is formed into a protective cover over the top surfaces of the induction coil to provide a low impedance magnetic path to protect the sensing coils from being damaged by excessive induction during the induction heating process and to also provide safety screening for EMC and adjacent personnel.

Preferably each of the sensor coils has capacitors added in order to make it resonate at the sensor frequency which is considerably different to, but not a harmonic of, the induction coil frequency.

During location of the metallic substance, the induction coil itself, or a separate auxiliary coil coaxial with the induction coil, is energised at the sensor frequency by a suitable low power signal source which is disconnected automatically prior to the induction cycle to prevent damage. The resonance of the senor coils allows the voltage pick-up sensitivity to be greatly increased, which allows for the detection of a metallic substance over a greater distance.

The sensor coils are mechanically placed to pick up equal voltages when the metallic substance to be detected is situated exactly central with the induction coil. The presence of a metallic substance within the sensor frequency field alters the pick-up voltage on each of the sensor coils in relation to the position of the metallic substance beneath the induction coil. The pick-up voltage of each sensor coil is fed into a microprocessor via a conditioning circuit and the value of each reading can be used by the microprocessor to calculate co-ordinates of the centre of the metallic substance in relation to the centre of the induction coil, providing the metallic substance is within range. These co-ordinates would allow the microprocessor to drive said visual display which would facilitate manual placement of the induction coil and also in a further embodiment the driving of X and Y axis motors to provide for automated operation.

The microprocessor also subtracts each sensor coil reading from the result of the opposite sensor coil. If the result of the subtraction is zero or within an acceptable low bank of numbers then the metallic substance is centrally disposed below the induction head in the line joining the two opposite sensor coils. Similarly the orthogonal pair of sensor coils are measured. If both pairs of sensor coils produce a central result then after a number of similar successive stable readings the microprocessor would consider the metallic substance to be centrally disposed between the induction coil and initiate the next step required in the induction heating cycle. The use of opposite pairs of sensor coils allows the subtraction process to cancel out any temperature drift in the system.

Preferably, the whole assembly consisting of the induction coil, the auxiliary coil if utilised and the sensor coils is completely encapsulated in a suitable potting compound such as a low exothermic epoxy, which ensures a very robust device. In order to reduce the conduction of heat from the induction head to the sensor coils via the potting compound, air slots are moulded into the region between each sensor coil and the adjacent coil windings. To cool the induction coil a gap can be provided between the induction coil and encapsulant for the flow of coolant about the induction coil.

BRIEF DESCRIPTION OF THE DRAWINGS

By way of example only, specific embodiments of the present invention will now be described, with reference to the accompanying drawings, in which.

DESCRIPTION OF THE PREFERRED EMBODIMENTS

Figure 1:
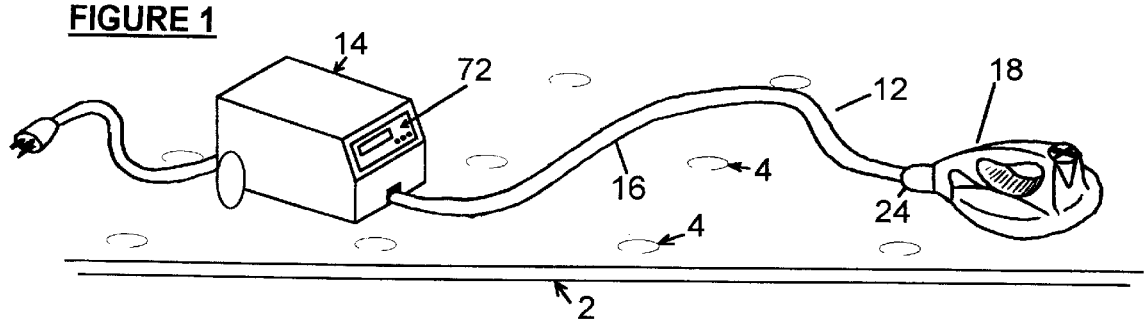
FIG. 1 is a perspective view of an induction heater, constructed in accordance with one embodiment of the present invention, illustrating the heater in place over a membrane.

To fit a single or multi-layer membrane 2 to a roof structure a plurality of circular steel anchor discs 4 are firstly screwed to a roof substructure 6 through thermal insulation blocks 8, the top surface 10 of each anchor disc 4 being pre-coated with a heat activated adhesive. The membrane 2 is then rolled across the roof structure thereby concealing the discs 4. A remote electromagnetic induction heater 12 above the membrane heats up the anchor disc 4 whereby the adhesive is activated and adheres the membrane 2 to the disc 4.

The induction heater, as best illustrated in FIG. 1, comprises a rainproof main box 14, a heavy duty, demountable, flexible cable 16 and an induction head 18.

Figure 3:
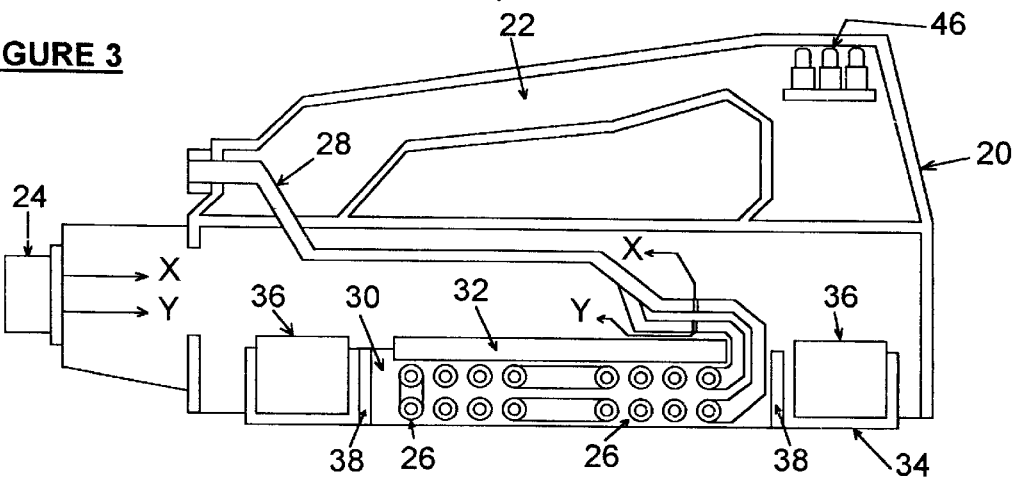
FIG. 3 is a sectional view of the head of FIGS. 1 and 2.

The induction head 18, see FIG. 3, comprises a plastics body 20 having a handle 22 to allow manual placement at a desired location. A cable socket 24 is adapted to receive one end of the cable 16.

The head 18 has an induction coil 26 in the form of a two layer pancake, formed from copper tubing, the tubing extends at 28 in the form of two silicon tubes to permit flow of a cooling fluid through the induction coil 26.

Figure 8:
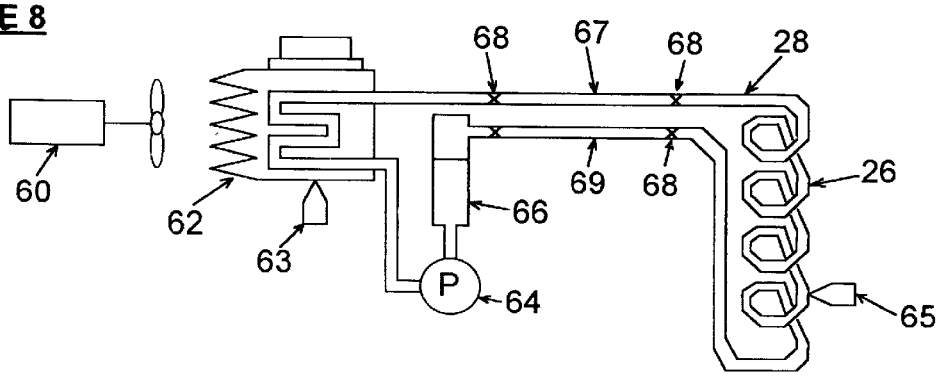
FIG. 8 is a schematic view of the cooling system of the induction heater.

The cooling system, see FIG. 8, has several high pressure fans 60 blowing air at ambient temperature through fins of a heat exchanger 62 within box 14 and which cools the fluid that is pumped around the closed circuit by a small circulating pump 64. This fluid is used to cool the electronic drive circuit switching devices and also to remove excess heat generated in the induction coil 26. An expansion reservoir 66 allows for topping up the fluid and viewing of the fluid level by an operator, via a window (not illustrated).

The closed circuit comprises the induction coil 26, additional tubing 28 and extends via an inlet and outlet tubes 67, 69 extending through the cable 16 to box 14. Each pipe carrying coolant through the cable 16 have self closing plugs and sockets 68 to facilitate disconnection of the cable 16 without losing coolant from the system.

The coil 26 is encapsulated in epoxy resin to form a rigid structure 30. A ferrite pad 32 is provided on top of the coil 26 to provide a low impedance path for the magnetic flux in the coil 26, and thereby provide a screen, form the magnetic field, for the operator. A self-adhesive PTFE coated glass woven cloth 34 is provided on the lower surface of the head 18 to provide a low friction surface for sliding the head 18 across the membrane 2.

Four location sensor coils 36 are also encapsulated within the body 20. To prevent the flow of heat through the encapsulant from the copper induction coil 26, a narrow air slot 38 is moulded into the encapsulant between each sensor 36 and the adjacent windings of the coil 26.

Figure 4:
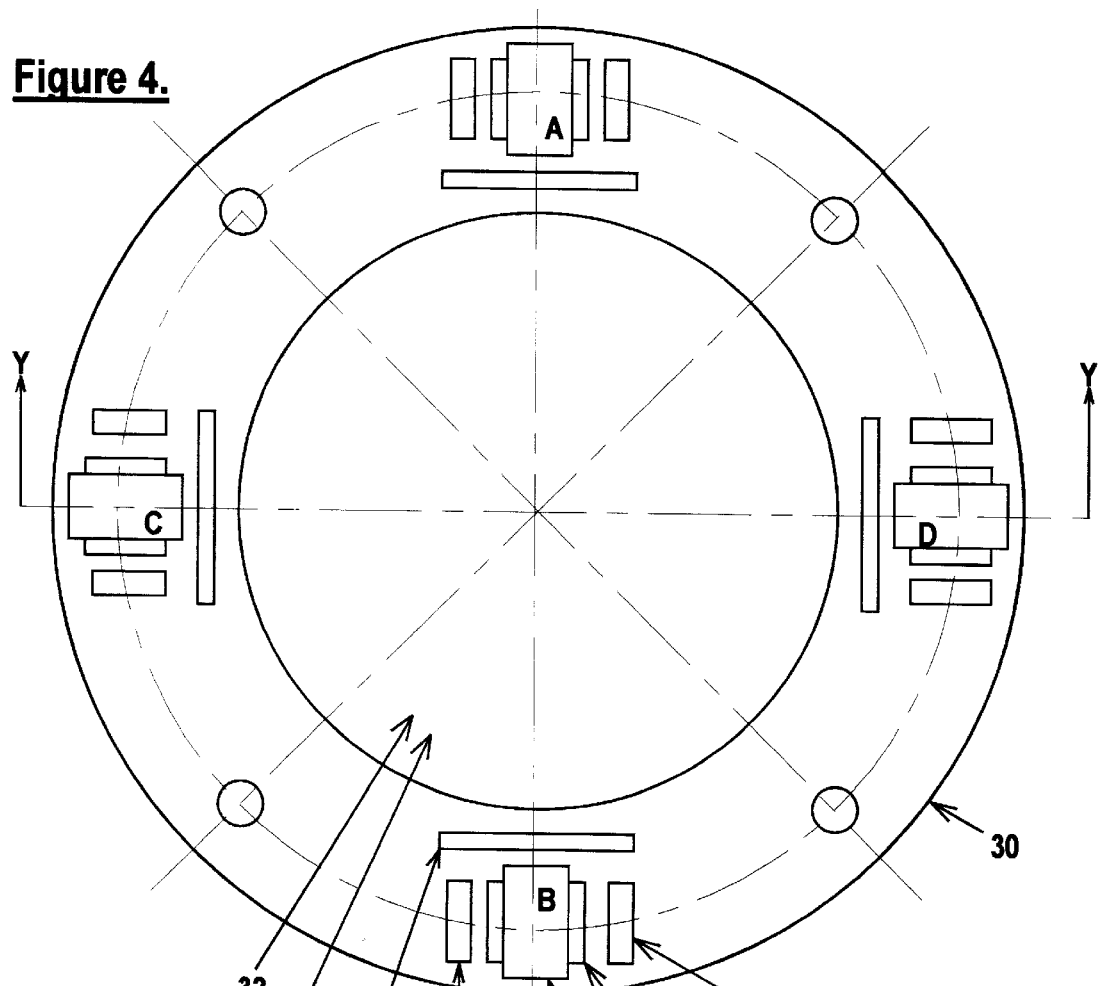
FIG. 4 is a schematic plan view of the induction head for locating and heating discs.
Figure 5:
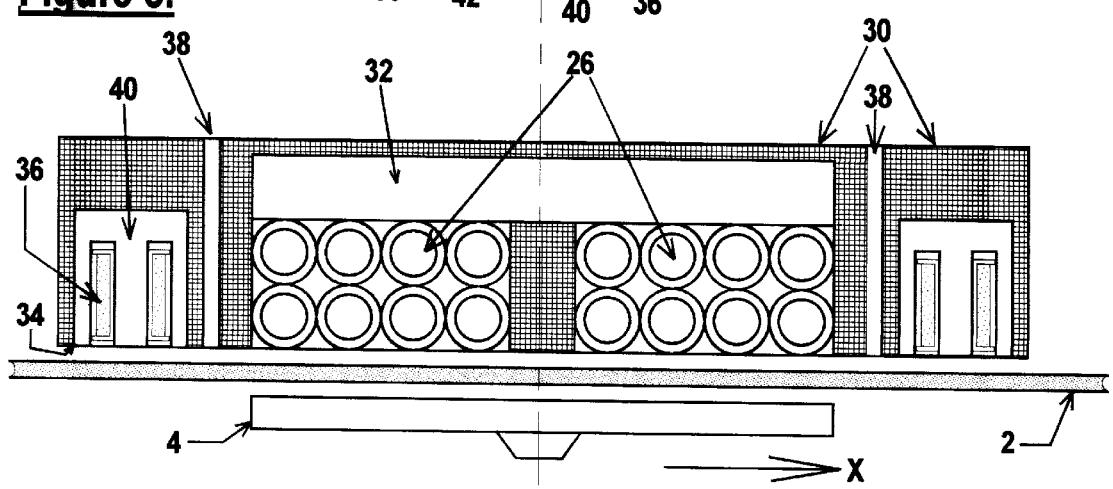
FIG. 5 is a sectional view along the direction y—y of FIG. 4.

As best illustrated in FIG. 5 each sensor 36 is enclosed by an individual high grad ferrite core 40 and provides the pole pieces on the same bottom plane as the induction coil 26. In FIG. 4 each sensor coil is separately named A, B, C or D. A and B is one pair, C and D is the other pair.

Tuning capacitors 42 are connected to each sensor coil to tune it to the sensor frequency of 9.7 kHz (in this example). The induction coil frequency is 53 to 55 kHz, rather different from the sensor frequency.

The position of each sensor core 40 can be mechanically adjusted during manufacture, along its radial centre line towards the induction coil 26, to achieve a peak output voltage which all four sensor coils 36 can achieve.

Figure 6:
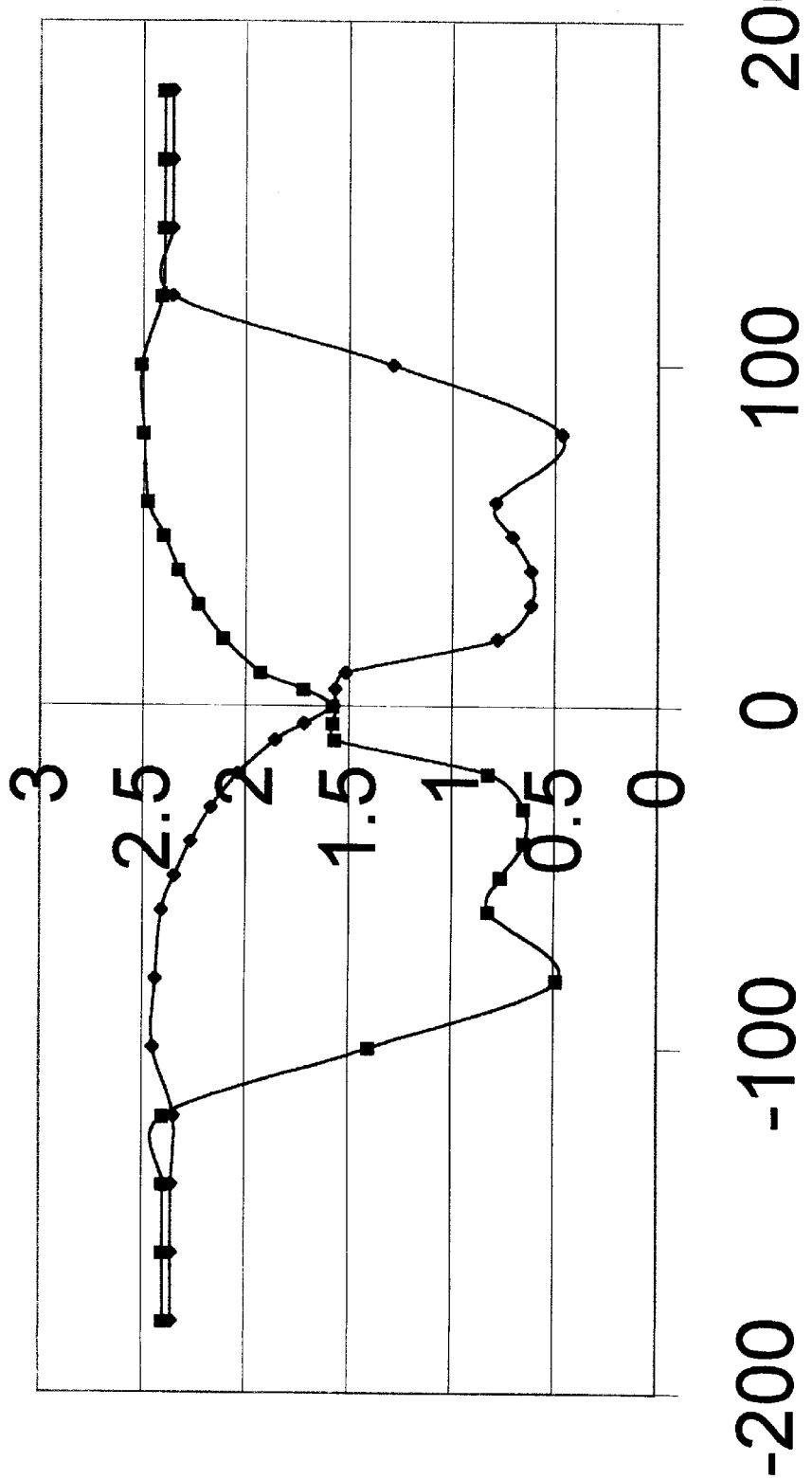
FIG. 6 is a graph of sensor peak output voltage on the centre vertical axis plotted against position of the metal anchor disc from left to right through the central position, on the horizontal axis. (The graph only shows the traces for one pair of sensor coils, the orthogonal pair of sensor coils have identical traces)

In this particular example the voltage was set at about 1.6 volts as shown on the graph in FIG. 6. It can be seen from the graph that as the induction coil assembly is moved over the metal anchor disk 4 from 200 millimeters off centre to the right, through the centre and on towards the left hand −200 millimeter position, that the voltage pick-up on each coil of the pair, only crosses at the 1.6 volt position which coincides with the central location. A microprocessor 44 continually reads the voltages on each sensor coil 36 and uses the values to drive a display 46 that shows the centre of the anchor disc 4 in relation to the centre of the induction coil 26. This display 46 allows a manual operator to move the induction coil assembly until the centres coincide. In an automated version, X and Y axis motors are driven from these values to move the induction coil assembly.

Figure 7:
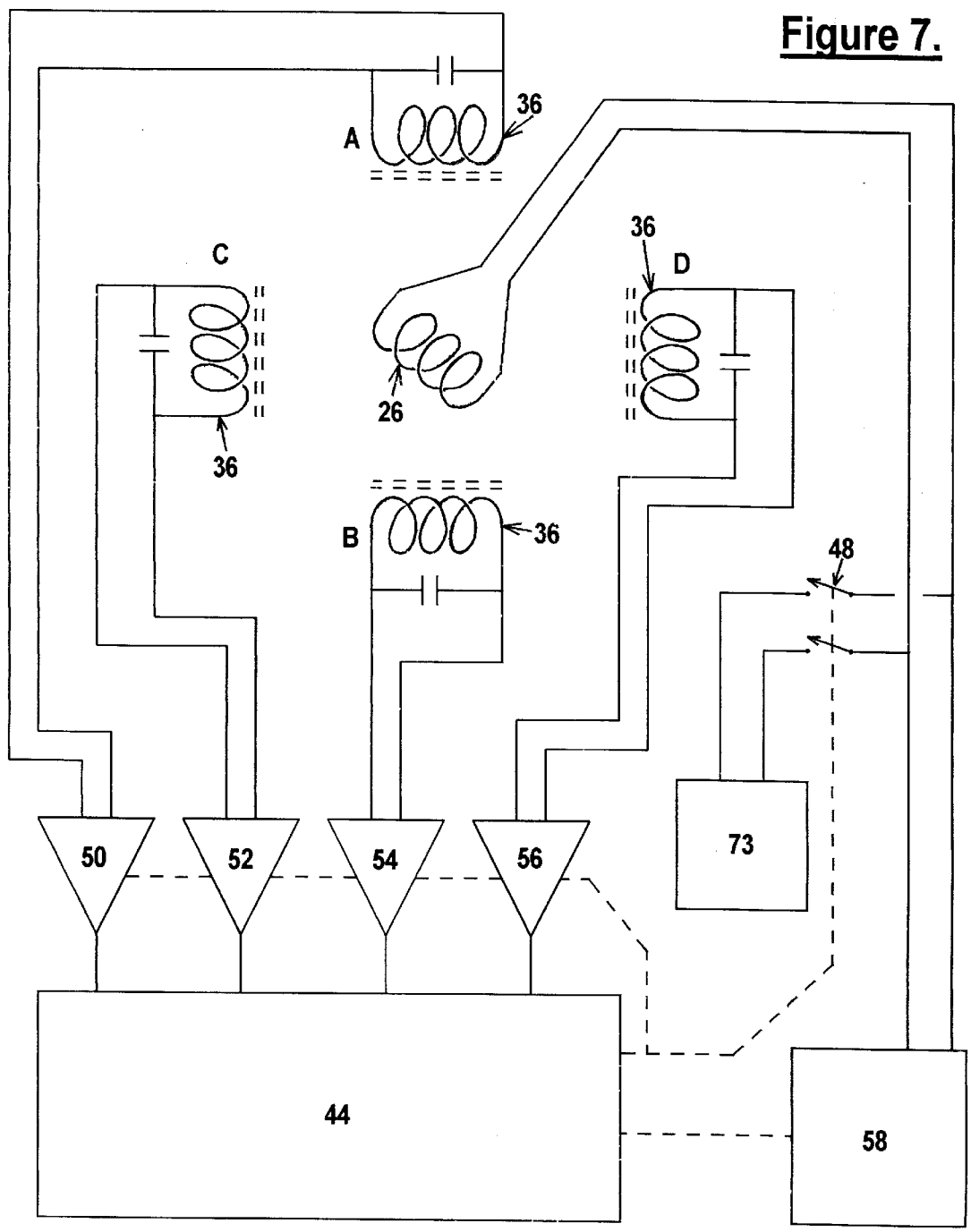
FIG. 7 is a schematic of the circuit layout of the induction heater.

After each read the microprocessor 44 tests for equality between opposite sensor coils 36 of each pair A B or C D that occurs below the cut-off voltage, which is 2.2 volts in this example. If both pairs of sensor coils produce an equal result then after a number of similar successive stable readings the microprocessor 44 would assume that the anchor disc 4 is central with the induction coil 26. The microprocessor 44 would set a software latch, then initiate the disconnection of the sensor frequency drive 73 by opening switch 48 in FIG. 7, apply protection to the conditioning circuits 50, 52, 54 and 56 and then enable an induction heating generator 58 which drives the main induction heater coil 26.

At the end of the induction heating cycle time the induction heating generator 58 is disabled by the microprocessor 44. The sensor frequency drive 73 is reconnected to the induction coil 26 by switch 48 and the protection is removed from the conditioning circuits 50, 52, 54 and 56. The microprocessor 44 continues to read the sensor coils 36 and only when the readings are above the cut-off voltage of 2.2 volts, in this example, is the software latch released. This software latch arrangement is to prevent the induction heat cycle being repeated unless the induction head 18 is completely removed from the last anchor disc location, otherwise the same anchor disc will be repeatedly heated.

Figure 2:
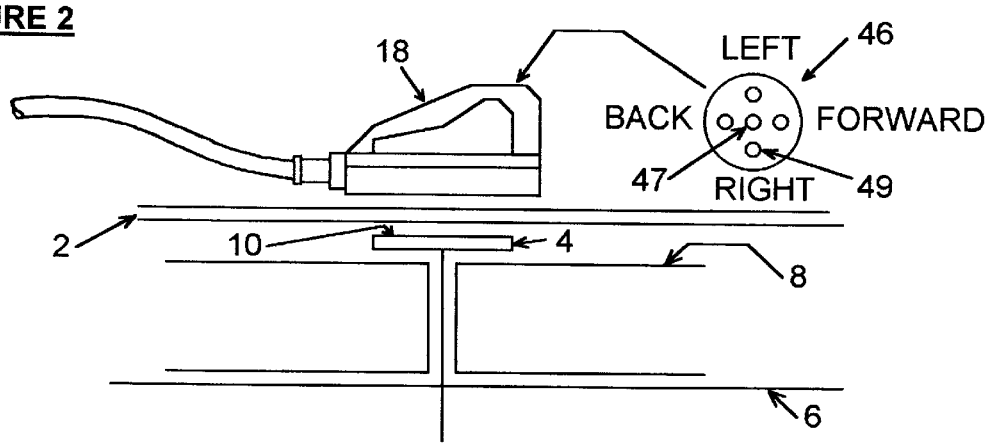
FIG. 2 is a perspective of the heater head of the induction heater of FIG. 1, with an enlarged detail of its location display, and illustrating the heater in place over a disc to be heated, the roofing structure being shown in cross-section.

Any one or more of outer four display lights on display 46 on the head 18, illuminating when the induction head 18 is swept over the membrane surface, indicates the presence of a metallic substance within 150 mm, see FIG. 2. The head 18 is then moved in the direction of the illuminated lights until only the centre red light 47 is illuminated. At this point, provided that the head 18 is sitting flat on the membrane 2, the anchor disc 4 will be centrally disposed about the centre of the induction coil 26.

If a metallic object, other than the anchor disc that the head 18 was designed to detect, is picked up, the centre light 47 will not illuminate, thus preventing false heating.

The software latch is provided to prevent a repeat heat cycle of the same anchor disc 4. The head 18 must be completely removed from any metallic substance, for a preset time, to extinguish all the red lights before the location and heat cycle can be continued with the next anchor disc 4.

During location, when the centre light 47 alone, has been illuminated for a preset time, the heat cycle will be automatically started. This delay is to prevent heating if there is subsequent accidental movement.

Whilst the heating cycle is in progress, the centre red light 47 will extinguish and the outer red display lights 49 will provide a rotating effect to indicate that heating is in progress.

At the same time as the heating is in progress a low frequency audible tone will pulse with each passing second to alert the operator not to move the head. The sounds emanate from a loudspeaker 70 mounted in the main induction heater box 14.

When the heating time has ended, a combination of higher frequency pulse tones are emitted from the loudspeaker 70 to tell the operator that the heat cycle has finished and that he should proceed to the next location. At the same time, the rotating display 49 of red lights ceases and the centre light 47 illuminates again until the head 18 is removed from the vicinity of the disc 4 that has been heated.

If the head 18 were to be removed from the location of the anchor disc 4 whilst still in the heating cycle, then the induction current would fall below a minimum preset limit and the heat cycle would be immediately terminated and this fact indicated by the fault light on a control panel 72 of the main box 14 being illuminated. If the head 18 is completely removed from the metallic substance 4 then the fault light will be extinguished and operation can be continued normally.

If the induction current in the head 18 were to rise above a preset limit, then the heat cycle will be terminated immediately to prevent damage to the equipment and a software lock-out latch set. This is indicated by the fault light on the control panel 72 of the main box 14 being illuminated. No further heat cycles are possible unless this lock-out is cleared, by switching the mains power off and then on again after a 5 second delay.

Figure 9:
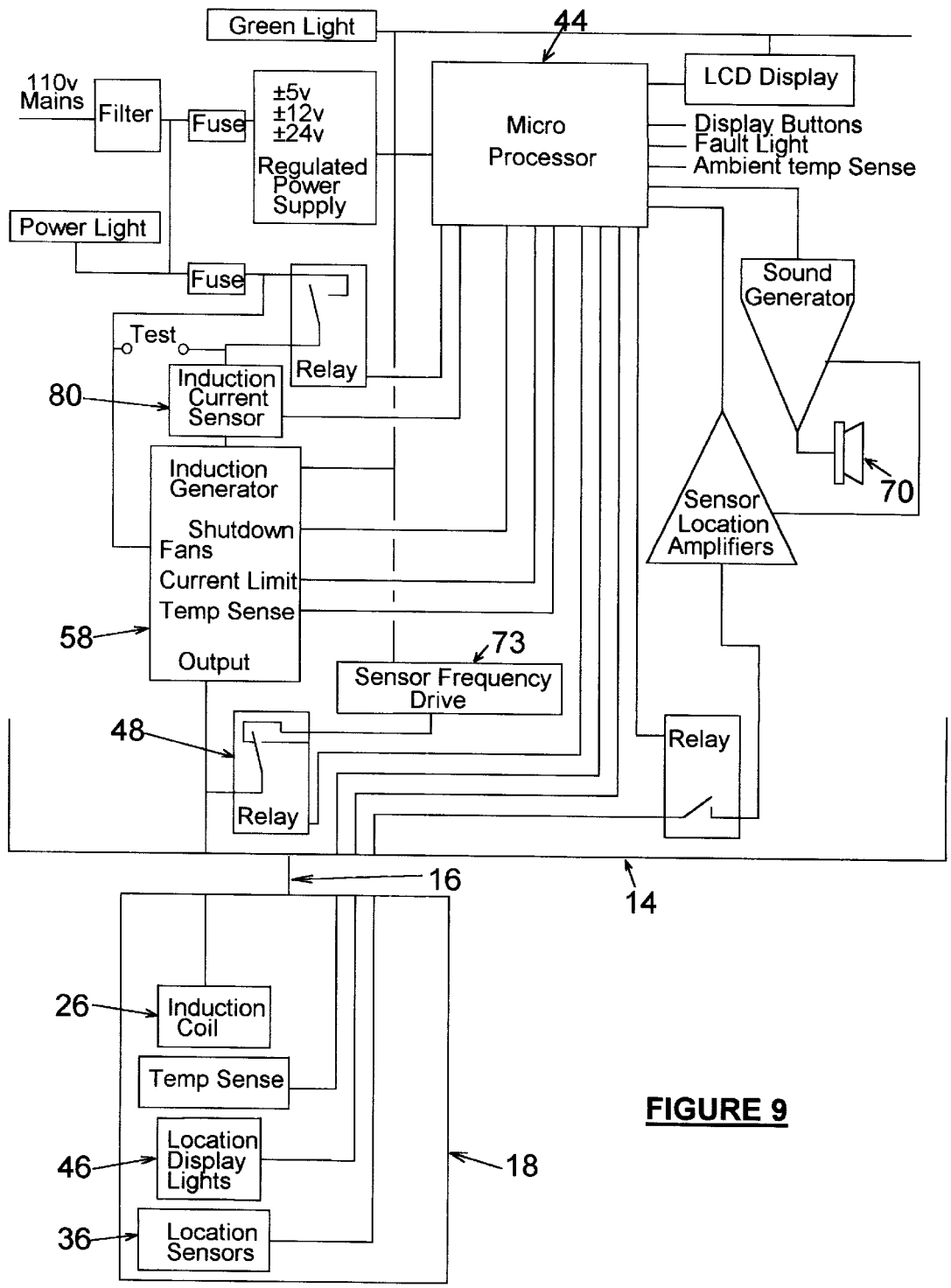
FIG. 9 is a block diagram providing an indication of the circuitry of the main box and induction head of the induction heater.
Figure 10:
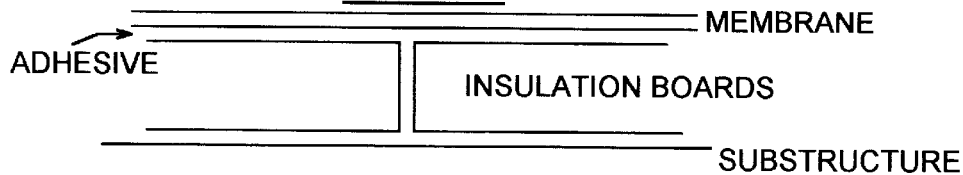
FIG. 10 is a schematic view of a known system for fixing a membrane to a roofing structure.

If the mains supply voltage were to fall below a preset limit then the heat cycle would be prevented or immediately terminated and this fact indicated by a slow flashing fault light on the control panel 72 of the main box 14, see FIG. 9.

If the mains supply voltage were to rise above a present limit, then further heat cycles would be prevented but an existing cycle would be completed and this fact indicated by a slow flashing fault light on the control panel 72 of the main box 14.

The fault light will be extinguished and it's prohibitions will be removed if the cause of the fault is corrected or removed.

Two electronic counters, are viewed by means of an 8 digit liquid crystal display on the control panel 72. The first counter must be pre-loaded, by use of the buttons on the front panel, with a number of heat cycles that are required. Each heat cycle that is carried out causes this counter to decrement and the balance is displayed. When all the cycles are done and the counter displays zero, no further heat cycles will be possible until a new number is entered. Before a new number can be entered, a pre-determined code must be entered via the buttons, to provide some degree of security against accident or unauthorized use. By entering this code, access is provided to a number of their functions which include setting the heat timer, viewing the original number of heat cycles that had been entered before the counter was decremented and also the number of cycles done since the new number was entered. This code can itself be changed, using the buttons, by entering a master code first and then entering a new code, which is then retained in memory until changed again.

The second counter displays the total number of heat cycles that the machine has ever done in it's life. This counter is nonresettable and can be viewed in 5 seconds when the accept button is pressed once, on the control panel. After 5 seconds the display will revert to its previous display.

The heat timer can be set via the buttons and by using the code. The time can be set to 2 decimal points of a second, to allow small increments and to any suitable maximum number of whole seconds.

It is also possible to divide the heat time into smaller sections with a delay between each section. The number of divisions and the time of each delay is adjustable via the buttons on the control panel 71 eg. Instead of one pulse of heat for 10 seconds, it may be better to have 2 pulses of 5 seconds with a delay of 3 seconds in between, to allow the membrane time to absorb the heat.

A high pitched pulse of tone is emitted each time a button is pressed, to provide operator feedback.

Two power lights are provided on the control panel 72. A large orange light shows that there is power available to the box 14. If this light is extinguished, then the power supply to the box 14 is at fault and the operator must sort it out. If this light is on but the small green light is off, then a fuse has blown in the power supply inside the box and it will have to be returned for repair.

The heating cycle starts when the micro processor 44 within the box 14 operates a relay that applies 110v power to an induction generator 58 via a current sensor 80. After a preset delay, the micro processor 44 releases the electronic shut-down. This starts the generator 58 at very low power which rises to full preset power at a controlled rate, thus preventing a sudden current surge.

When the heating time is ended, the shut-down is operated, which stops the induction current and after a preset delay, the relay will be released, which removes the 110v power. The use of the electronic shut-down means that the relay contacts do not have to switch the full load current, which prolongs the contact life, but they do provide complete isolation when open and are also able to break the full current in the unusual event of the shut-down failing to operate.

The induction current is controlled by the microprocessor 44, by monitoring the current sensor 80. If the current being monitored falls below the preset value, then the microprocessor 44 will reduce the current limit voltage, which allows the induction current to rise back to the preset value.

Similarly, if the current being monitored should rise above the preset limit, then the microprocessor 44 will raise the current limit voltage, thus returning the induction current back to the preset value. This provides a constant current system which compensates automatically should the mains voltage fluctuate or different membrane thicknesses be used and indeed for variations in the metallic consistency of the item being heated.

The microprocessor 44 monitors the induction coil temperature using sensor 65. If the temperature should rise above a preset limit then further heat cycles would be prevented until the induction coil 26 cooled down. This will be indicated by the fault light on the control panel 72 quickly flashing.

The micro processor also monitors using sensor 63 the ambient temperature of air coming into the box 14 through the vents and this data is used to alter the heat time slightly in order to allow for hot or cold weather. This is in order to produce uniformity in heating, regardless of the weather.

Once heating times are obtained by experimentation, for each type of membrane, then these controls will maintain the times over a wide range of conditions and for most countries.

Control switches are also provided within the box 14 to aid the setting up and testing during manufacture or repair. These are not available to the user of the equipment.

One switch is to disable the low induction current cut out, used when tuning the induction generator 58.

Another switch is used to make the induction generator 58 carry out repetitive heat cycles once every 18 seconds. This is to enable the induction generator 58 to be tuned without having to operate the location system.

Another switch is used to disable the power relay to the induction generator 58 which allows for operating the induction generator 58 continuously or at 18 second intervals, at greatly reduced power, by applying a suitable dropping resistor to the test terminals across the relay, again used in tuning the induction generator 58.

A further switch is used to disable the location output from triggering a heat cycle when a test metallic substance is placed centrally below the induction coil 26. This is used to test the display lights on the induction heat 18 and to adjust the offset of each location sensor amplifier to centralise a test metallic sample below the induction coil.

Another switch is used to disable the ambient temperature correction facility to allow an uncorrected time setting to be made at a test temperature, so that the effect of the correction can then be measured.

Figure 11:
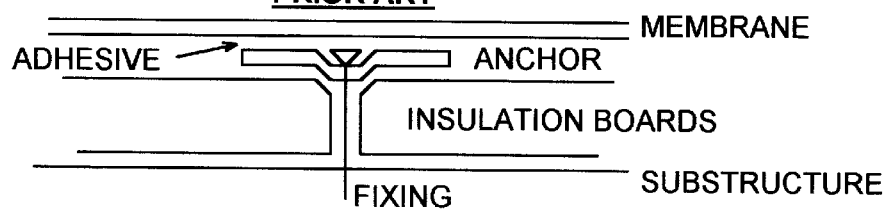
FIGS. 11 to 14 are schematic views of further systems for fixing membranes to roofing structures.
Figure 12:
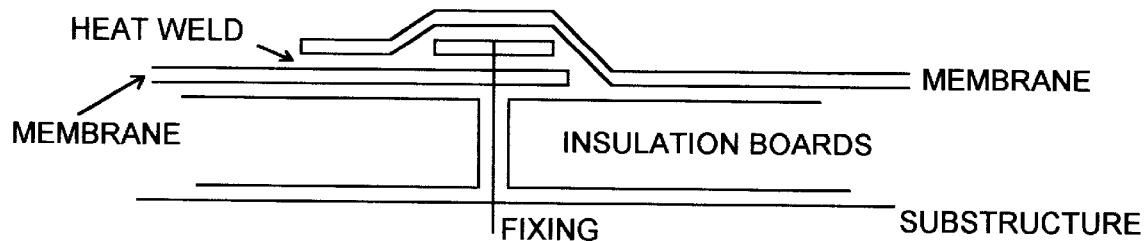
Figure 13:
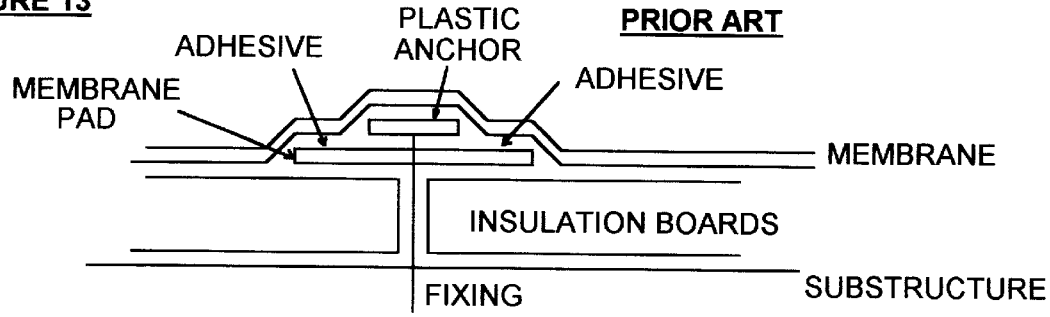
Figure 14:
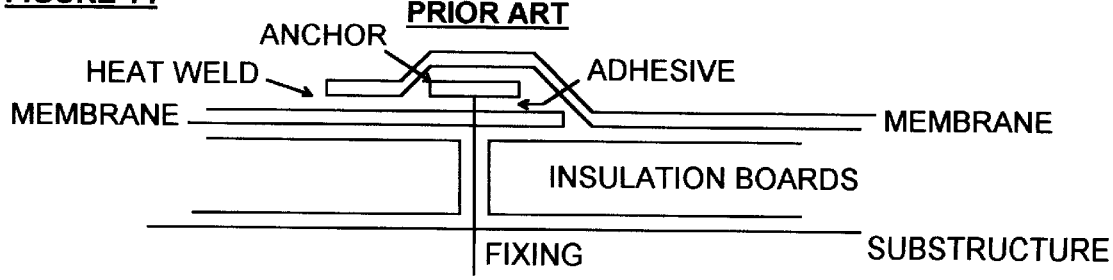

The present system can be used with the anchor plate in FIG. 11 which takes the form of an 80 mm diameter galvanised steel disc of any suitable thickness with regard to rigidity with the heat activated adhesive factory applied to the upper surface. In FIG. 12, a 40 mm galvanised steel anchor disc may be used, with heat activated adhesive factory applied to the lower surface, as shown in FIG. 14. In FIG. 13, the anchor disc is of a plastic material such as rigid PVC or Nylon and could be about 80 mm diameter. The membrane pad would be about 150 mm diameter and has received a factory coating of heat activated adhesive mixed with a powdered metallic substance on the supper surface of the pad that is clear of the anchor disc. Difference sizes of induction coil winding would be required to effectively heat the different anchor systems and this is accomplished with interchangeable induction coil assemblies.

The invention is not restricted to the above described embodiments and many modifications and variations can be made, for example the induction heater has been described as mains operated, but it could be battery operated. Alternatively the heater could be robotic and fully automated whereby it would perambulate over the surface under its own power utilising built in sensors for direction determination, stopping only to heat each anchor disc as it is detected. The induction coil has been described as being in the form of a two layer pancake, formed from copper tubing through which a coolant can flow, alternatively the induction coil can be in the form of a flat bar and a gap provided between the induction coil and the encapsulant to provide a flow path for the coolant.

I claim:

1. An induction heater assembly for heating a metallic substance hidden beneath a sheet of material, said induction heater assembly comprising:

an induction coil for remotely heating said metallic substance through said sheet of material;

a sensor device for detecting a hidden location of said metallic substance beneath said sheet of material;

a visual indicator device; and a control device coupled to said sensor device and said visual indicator device for receiving an output from said sensor device and controlling said visual indicator device responsive to said sensor device output to indicate a direction in which the induction heater assembly must be moved to facilitate placement of said induction coil over said metallic substance.

2. The induction heater of claim 1 wherein said sensor device comprises a four quadrant metal detector having four sensing coils.

3. The induction heater of claim 2 wherein said visual indicator device comprises four outer lights aligned in symmetrically opposed relation along two orthogonal center lines, and a fifth center light positioned at the central intersection of said center lines, said visual indicator device being operative wherein said four outer lights are selectively illuminated responsive to output from said sensing coils to indicate direction of movement of the induction heater assembly, said center light being selectively illuminated when said induction coil is aligned over said metallic substrate.

4. The induction heater of claim 2 wherein said sensing coils are respectively placed in symmetrically opposed relation along two orthogonal center lines that pass through a vertical axis of the induction coil, said sensing coils having sensing poles positioned within a plane extending through a lower face of said induction coil.

5. The induction heater of claim 4 wherein said induction coil and said sensing coils are imbedded within an insulating body, said insulating body having air gaps formed therein between said inductor coil and each of said sensing coils.

6. The induction heater of claim 4 wherein said sensor device further comprises a first frequency generator for a generating a first frequency signal through said induction coil, and second frequency generator for generating a second frequency signal through said sensing coils, said second frequency being lower than said first frequency, said magnetic fields generated by said sensing coils interacting with said magnetic field generated by said induction coil to provide an output signal.

7. The induction heater of claim 6 wherein said sensor device outputs voltage signals proportional to a sensing distance of said metallic substance from each of said sensing coils.

8. The induction heater of claim 7 wherein said control device subtracts the voltage signals of opposed pairs of sensors to compensate for temperature fluctuations.

9. The induction heater of claim 8 wherein said visual indicator device comprises four outer lights aligned in symmetrically opposed relation along two orthogonal center lines, and a fifth center light positioned at the central intersection of said center lines, said visual indicator device being operative wherein said four outer lights are selectively illuminated responsive to said voltage signals from said sensing coils to indicate direction of movement of the induction heater assembly, said center light being selectively illuminated when the subtracted voltage signal values of said pairs of sensing coils are substantially equal to zero.

10. The induction heater of claim 7 wherein said control device including means for disconnecting the first frequency generator from said induction coil during operation of a heat cycle.

11. The induction heater of claim 1 further comprising an audible indicator device.

12. The induction heater of claim 1 wherein said induction coil and said sensor device are mounted within a unitary housing, said housing including insulation disposed between said induction coil and said sensor device to reduce the flow of heat from the induction coil to said sensor device.

13. The induction heater of claim 1 further comprising an inductor coil cooling device.

14. The induction heater of claim 13 wherein said inductor coil comprises a tube having a path for the flow of a cooling fluid, said inductor coil cooling device comprising a cooling fluid within said inductor coil, and a circulating device for circulating said cooling fluid within said inductor coil.

15. The induction heater of claim 14 wherein said cooling device further comprises a heat exchanger in fluid communication with said inductor coil.

* * * * *